United States Patent [19]
Oka

[11] Patent Number: 5,771,633
[45] Date of Patent: Jun. 30, 1998

[54] METHOD FOR PRODUCING POTATO TUBERS USING A GRAFT PLANT

[75] Inventor: Ichiro Oka, Shizuoka, Japan

[73] Assignee: Japan Tobacco Inc., Tokyo, Japan

[21] Appl. No.: 727,478

[22] PCT Filed: Feb. 14, 1996

[86] PCT No.: PCT/JP96/00314

§ 371 Date: Oct. 16, 1996

§ 102(e) Date: Oct. 16, 1996

[87] PCT Pub. No.: WO96/25030

PCT Pub. Date: Aug. 22, 1996

[30] Foreign Application Priority Data

Feb. 16, 1995 [JP] Japan ................................. 7-050317

[51] Int. Cl.[6] .............................. A01B 79/00; A01C 1/00; A01G 31/00; A01G 1/06
[52] U.S. Cl. ................ 47/58; 47/59; 47/6; 800/DIG. 42; 800/240
[58] Field of Search ............. 47/58, 59, 6; 800/DIG. 42, 800/240

[56] References Cited

FOREIGN PATENT DOCUMENTS 0655192  11/1993  European Pat. Off. .
292216  4/1990  Japan ............................. A01G 9/02
5-284864  11/1993  Japan .

OTHER PUBLICATIONS

Brown et al. (1994) *Euphytica* 74:51–57.
Ooms et al. (1985) *Plant Molecular Biology* 5:205–212.
G.A. Thijn (1954) *Euphytica* 3:28–34.
Wheeler et al. (1990) *American Potato Journal* (67) pp. 177–187.
(1985) Assoc. for the Spread of Agr. Tech. *Techniques for Culturing Potato in Hokkaido–Table Potato and Potato for Food Processing* p. 71.
Akita et al. 1994. Plant Cell Reports 13:184–187.

*Primary Examiner*—David T. Fox
*Assistant Examiner*—Kent L. Bell
*Attorney, Agent, or Firm*—Birch, Stewart, Kolasch & Birch, LLP

[57] ABSTRACT

The present invention relates to a method for producing potato tubers comprising grafting a potato plant as a scion on a solanaceous plant as a stock and culturing the resultant graft plant by hydroponics to thereby form tubers on the aerial part of the graft plant. By the method of the invention, decrease in the ratio of disease infection in tubers as well as reduction of working hours and work intensity are intended.

10 Claims, 1 Drawing Sheet

METHOD FOR PRODUCING POTATO TUBERS USING A GRAFT PLANT

FIELD OF THE INVENTION

The present invention relates to a method for producing potato tubers comprising grafting a potato plant as a scion on a solanaceous plant as a stock and culturing the resultant graft plant by hydroponics to thereby form tubers on the top (aerial part) of the graft plant. Those tubers produced by this method are useful as seed potatoes.

BACKGROUND OF THE INVENTION

With respect to grafting using potato, there have been known a method in which a virus-infected potato plant is grafted on a new variety or a breeding material to thereby assay their resistance to the virus (for example, see Brown, C.R. et al., 1994, Euphytica 74:51–57); a method of utilizing grafting in crossing for breeding wherein potato is grafted on tomato to thereby promote the flowering of mother plants which are difficult to flower (Thijn, G.A., 1954, Euphytica 3:28–34) and so forth.

When grafting has been carried out using potato as a scion, occasionally tubers are formed on the top (aerial part) of the resultant graft plant. For example, Yoshida has reported that, when potato has been grafted on tomato, aerial tubers resembling those which are formed in the case of suffering from black scurf are formed in the middle of the stem (In *Techniques for Culturing Potato in Hokkaido—Table Potato and Potato for Food Processing,* supervised and edited by Kiyoshi Sunada, published by the Association for the Spread of Agricultural Technology in 1985). Ooms et al. have also reported that, when a transformed potato line Mb1501B has been grafted on an untransformed potato variety, tubers are formed on Mb150B on the top (G. Ooms & J.R. Lenton, Plant Molecular Biology 5:205–212, 1985).

Problem for Solution by the Invention

If such tubers formed on the top of a plant can be used as seed potatoes, it is possible to reduce harvesting lab or and also to improve the quality of seed tubers per se. However, the methods described above have various problems if they are utilized for production of seed potatoes. Thus, tubers formed on the top have not been used as seed tubers to date.

Summary of the Invention

The present inventor has intensively and extensively investigated into a method for forming on the top of a graft plant tubers appropriate as seed potatoes. As a result, the inventor has found that by culturing a graft plant by hydroponics, tubers become larger and a higher yield of them can be obtained. Thus, the invention has been achieved.

In other words, the present invention relates to a method for producing potato tubers comprising grafting a potato plant as a scion on a solanaceous plant as a stock and culturing the resultant graft plant by hydroponics to thereby form tubers on its top .

Now, the present invention will be described in detail.
<Process of grafting a solanaceous plant with potato>

In the present invention, grafting is performed using a solanaceous plant as a stock and a potato plant as a scion.

As a solanaceous plant which serves as a stock, any solanaceous plant may be used as long as it can be grafted with potato. For example, a plant belonging to the genus Solanum such as eggplant, potato which does not have an ability to form tubers; a plant belonging to the genus Lycopersicon such as tomato; a plant belonging to the genus Capsicum such as chili pepper; and a plant belonging to the genus Nicotiana such as tobacco may be enumerated.

As a potato plant, not only those plants belonging to *Solanum tuberosum* but also hybrid plants obtained by crossing *Solanum tuberosum* with other plants or mutants of *Solanum tuberosum* which have been spontaneously or artificially mutated may be used in the present invention as long as they have an ability to form tubers.

As a means to graft a solanaceous plant with potato, no special method is required. For example, conventional methods commonly applied to vegetables, such as cleft grafting, cutting grafting and air grafting, may be used.

<Process of culturing the graft plant and forming tubers>

The graft plant created by the above procedures is cultured to form tubers on its top. The culturing of the graft plant is performed by hydroponics. Briefly, the plant is cultured from the grafting process to the formation of tubers with a culture solution alone without using soil. The culturing may be carried out anywhere in a greenhouse or an isolation chamber into which no insect pests such as aphids enter. Preferably, the culturing is carried out in a temperature-controllable greenhouse. The portion on which tubers are formed is the top (aerial part), as shown in FIG. 1. More specifically, tubers are formed on nodes of the stem or on stolons elongating from those nodes. Light conditions during culturing are not particularly limited. However, it is preferred that the portion of tuber formation be placed under dark conditions.

<Process of tuber harvesting>

When tubers have grown into a suitable size as seed potatoes, they are harvested. Tuber harvesting may be carried out successively from those tubers grown into a suitable size as seed potatoes. Alternatively, tubers may be harvested at once when they have sufficiently matured. Since these tubers are formed on the top, no work for digging up tubers from soil is necessary.

DETAILED DESCRIPTION OF THE INVENTION

Figure 1:
FIG. 1 is a photograph of aerial potato tubers.

[Reference Example] Culture of a Graft Plant in a Pot (i.e., by Soil Culture)
(Growing of Stocks)

Seeds of a tomato variety Momotaro (sold by Takii Seed and Stocks Co., Ltd.) were sown in soil contained in a pot. After germination, seedlings from which leaves began to appear were transplanted individually to a pot about 9 cm in diameter and about 7 cm in height. They were grown in a temperature-controlled greenhouse (day temperature: 20°–25° C.; night temperature: 15°–18° C.) to obtain stocks.
(Growing of Scions)

On the other hand, plantlets (having a stem length of 5–8 cm and 5–10 leaves which had been stored at Japan Tobacco Research Institute for Genetics and Breeding) of in vitro virus-free potato plants (varieties: Toyoshiro and May Queen) were planted in a plastic vat (34×22 cm, height 7 cm) containing a 1000-fold dilution of a commercial fertilizer "Liquid Hyponex 5-10-5" (sold by Hyponex Corporation). These were grown by hydroponics in a temperature-controlled greenhouse to obtain scions.
(Grafting)

When two or three leaves foliated in the tomato seedlings which would be the stocks, a slit was made with a razor blade above the first or second leaf in the seedling. On the other hand, the potato seedlings grown as described above were cut off below the upper second or third leaf and the upper portion was grafted on the slit of the tomato seedling.

(Culture of the Graft Plant, and Formation and Harvest of Tubers)

The resultant graft plant was cultured in a temperature-controlled greenhouse. About two weeks from the grafting, the graft plant was transplanted into an pot about 18 cm in diameter and about 15 cm in height. During the culturing, axillary buds formed on the tomato portion were removed occasionally.

About one month from the grafting, axillary buds of potato began to thicken and tubers were formed. The thickening of tubers began from those nodes located close to the graft union, i.e., from the lower nodes of the potato stem. Further, most of the tubers were formed directly on nodes of potato stems. In May Queen, however, part of tubers were formed at the end of stolons elongated from nodes.

These tubers were harvested about four months from the grafting.

The surface of the tubers exhibited green and purple colors since they had been exposed to light and there were observed leaf-like processes in buds near the apex. With respect to the other morphology, no big difference was observed between the above tubers and those tubers formed in soil.

About one month before harvesting, leaves of Toyoshiro, the scion, were collected and assayed for potato virus X (PVX), potato virus Y (PvY), potato virus S (PVS) and potato leaf-roll virus (PLRV) by the enzyme linked immunosorbent assay (ELISA, using antibodies sold by Boehringer Mannheim). As a result, no virus was detected as shown in Table 1.

TABLE 1

Results of Virus Assay by ELISA

| Assay sample | ELISA value | | | |
|---|---|---|---|---|
| | PVX | PVY | PVS | PLRV |
| Graft plant (Toyoshiro) | 0.007 | 0.052 | 0.051 | 0.000 |
| Control (positive control) | 0.827 | 0.737 | 1.574 | 0.725 |

Notes)
ELISA value: The value measured one hour after the addition of a coloring agent (at 25° C.).
Assay sample: The Toyoshiro sample was prepared by diluting leaf sap about 10-fold with a buffer solution. The positive control was an accessory to the ELISA kit.

<Tuber Yield>

With respect to May Queen, 7.5 tubers of 10 g or more and 4.0 tubers of 1–10 g were obtained per one individual of the graft plant. In the total, 11.5 tubers weighing 184 g were obtained per one individual. With respect to Toyoshiro, 7.0 tubers of 10 g or more and 2.0 tubers of 1–10 g were obtained per one individual of the graft plant. In the total, 9.0 tubers weighing 249 g were obtained per one individual.

[Example] Culture of a Graft Plant by Hydroponics

Seeds of a tomato variety Momotaro were sown on an urethane sponge and grown in a plastic vat (34×22 cm, 7 cm in height) by hydroponics to obtain stocks. When two or three leaves foliated in the thus obtained tomato seedling, the potato seedling (variety: Toyoshiro) grown in the above Reference Example was grafted on it.

About 40 days from the grafting, the resultant graft plant was transplanted to a commercial hydroponics device "Home Hyponica 302" (sold by Kyowa Co., Ltd.). As a nutrient solution for culturing, a 1000-fold dilution of "Fine Powder Hyponex 6.5-6-19" (sold by Hyponex Corporation) with water was used. The graft plant was cultured under such a condition that only the root of the tomato stock was dipped in the nutrient solution.

In order to promote the formation of tubers, the foliage portion below 80 cm in height was surrounded with a corrugated cardboard board and a black vinyl sheet to put this portion under darkness when the plant grew to about 1 m in height. About one month from this darkness treatment, tubers began to be formed on potato nodes located close to the graft union.

About three months from the transplantation to "Hyponica", tubers were harvested. As a result, 13.5 tubers of 10 g or more and 3.0 tubers of 1–10 g were obtained per one individual of the graft plant. In the total, 16.5 tubers weighing 494 g were obtained per one individual.

Secondary growth occurred in part of the tubers and leaf-like processes were observed in buds near the apex. With respect to other morphology, no big difference was observed between the above tubers and those tubers formed in soil. In addition, the surface of the tubers exhibited yellow-white color since they had thickened under dark conditions.

The test described above was conducted in a temperature-controlled greenhouse (day temperature: 20°–25° C.; night temperature: 15°–18° C.). The amount of tuber production and other data obtained in Reference Example and Example are shown in Table 2.

TABLE 2

| | | Number and Weight of Tubers produced per One Individual of Graft Plants | | | | |
|---|---|---|---|---|---|---|
| | Potato | No. of Tubers produced (No./Individual) | | | Total Weight | |
| Culture | Variety | Tuber Size | | | of Tubers | |
| Method | of Scion | >10 g | 1–10 g | Total | g | Remarks |
| Soil culture (pot) | May Queen | 7.5 | 4.0 | 11.5 | 184 | Reference Example |
| Soil culture (pot) | Toyoshiro | 7.0 | 2.0 | 9.0 | 249 | Reference Example |
| Hydroponics | Toyoshiro | 13.5 | 3.0 | 16.5 | 494 | Example |

[Effect of the Invention]

The tubers obtained by the method of the invention are of a sufficient size directly culturable in field as seed potatoes and, at the same time, they have the following advantages since they are formed on the aerial part. Compared to those tubers formed in soil by conventional methods, the tubers produced by the method of the invention are not in direct contact with soil and thus they are by far less exposed to the danger of being infected with soil diseases; the ratio of disease infection in them is extremely low. Furthermore, the method of the invention is less likely to make scratches or cuts on the surface of tubers during harvesting work which would become entrance for disease. In addition, compared to conventional methods in which tubers are digged out from soil, the harvesting work is extremely easy in the method of the invention and working hours and work intensity can be reduced.

According to conventional methods of seed potato production, seed potatoes are propagated for several generations in a field and thus the possibility of virus infection is considerably high even if strict management is conducted. On the other hand, in the method of the invention, tubers are not infected with viruses when they are cultured in a greenhouse or an isolation chamber having such a structure that no insect pests such as aphids invade.

What is claimed is:

1. A method for producing potato tubers comprising:

grafting a potato plant as a scion on a tomato plant which does not form tubers as a stock; and culturing the resultant graft plant by hydroponics to thereby form tubers on the aerial part of said graft plant.

2. The method of claim 1, which further comprises the step of harvesting tubers thus formed and using the tubers as seed potatoes.

3. The method of claim 1, wherein most of the tubers that said plant produces are at least 10 grams.

4. A method for producing potato tubers, comprising:

grafting a potato plant as a scion on a tomato stock plant which does not form tubers; and culturing the resultant graft plant by hydroponics to thereby form tubers on the aerial part of said graft plant while maintaining a part of said graft plant which forms tubers in the aerial phase.

5. The method of claim 4, wherein most of the tubers that said plant produces are at least 10 grams.

6. The method of claim 4, wherein said solanaceous plant is tomato variety Momotaro.

7. The method of claim 1, or 6 wherein said scion is from a potato plant variety Toyoshiro.

8. The method of claim 1, or 6 wherein said scion is from a potato plant variety May Queen.

9. The process of claim 1, which is performed in a greenhouse.

10. The process of claim 4, which is performed in a greenhouse.

* * * * *